(12) United States Patent
Arberg et al.

(10) Patent No.: US 9,143,479 B2
(45) Date of Patent: Sep. 22, 2015

(54) DHCP PROXY IN A SUBSCRIBER ENVIRONMENT

(75) Inventors: Peter Arberg, Hojbjerg (DK);
Arunkumar M. Desigan, Santa Clara, CA (US); Kishore Krishna Seshadri, Saratoga, CA (US); Robert G. Kilfoyle, Campbell, CA (US); Ganesan Vivekanandan, San Jose, CA (US)

(73) Assignee: ERICSSON AB, Stockholm (SE)

( * ) Notice: Subject to any disclaimer, the term of this patent is extended or adjusted under 35 U.S.C. 154(b) by 413 days.

(21) Appl. No.: 13/557,128

(22) Filed: Jul. 24, 2012

(65) Prior Publication Data

US 2013/0060891 A1    Mar. 7, 2013

Related U.S. Application Data

(63) Continuation of application No. 10/956,175, filed on Sep. 30, 2004, now Pat. No. 8,230,067.

(60) Provisional application No. 60/516,541, filed on Oct. 31, 2003.

(51) Int. Cl.
*G06F 15/16* (2006.01)
*H04L 29/12* (2006.01)

(52) U.S. Cl.
CPC ........ *H04L 61/2015* (2013.01); *H04L 29/1282* (2013.01); *H04L 61/6013* (2013.01)

(58) Field of Classification Search
CPC ............ H04L 61/2015; H04L 29/1282; H04L 61/6013; H04L 45/00; H04W 88/10
USPC ........................................................ 709/217
See application file for complete search history.

(56) References Cited

U.S. PATENT DOCUMENTS

| 6,195,689 | B1 * | 2/2001 | Bahlmann ..................... 709/217 |
| 6,223,222 | B1 | 4/2001 | Fijolek et al. |
| 6,876,667 | B1 * | 4/2005 | Synnestvedt et al. ......... 370/466 |
| 6,895,443 | B2 * | 5/2005 | Aiken ........................... 709/245 |
| 6,952,428 | B1 * | 10/2005 | Necka et al. .................. 370/466 |
| 7,024,484 | B2 | 4/2006 | Alexis |
| 7,054,944 | B2 * | 5/2006 | Tang et al. .................... 709/229 |
| 7,072,337 | B1 | 7/2006 | Arutyunov et al. |

(Continued)

FOREIGN PATENT DOCUMENTS

WO    WO 9826530 A1 *  6/1998

OTHER PUBLICATIONS

Office Action mailed on Nov. 12, 2009 for U.S. Appl. No. 10/956,175, 30 pages.

(Continued)

*Primary Examiner* — Douglas Blair
*Assistant Examiner* — Imran Moorad
(74) *Attorney, Agent, or Firm* — Nicholson De Vos Webster & Elliott LLP

(57) ABSTRACT

Methods and apparatuses for a network element having DHCP proxy functionality are described. According to one embodiment, an exemplary method includes receiving, at a network element, a request for an IP address from a subscriber, in response to the request, on behalf of the subscriber, communicating with one or more IP address providers over a network to process the request, and responding to the subscriber with respect to the request as if the network element is an IP address provider, on behalf of the one or more IP address providers.

16 Claims, 13 Drawing Sheets

(56) References Cited

U.S. PATENT DOCUMENTS

| | | | |
|---|---|---|---|
| 7,096,273 | B1 | 8/2006 | Meier |
| 7,139,818 | B1 | 11/2006 | Kinnear, Jr. et al. |
| 7,254,630 | B1 | 8/2007 | Daude et al. |
| 7,263,559 | B2 * | 8/2007 | Yao et al. ............ 709/230 |
| 7,315,541 | B1 | 1/2008 | Housel et al. |
| 7,337,224 | B1 | 2/2008 | Van Horne, III et al. |
| 7,533,255 | B1 * | 5/2009 | Dommety et al. ......... 713/151 |
| 2002/0073182 | A1 | 6/2002 | Zakurdaev et al. |
| 2003/0187997 | A1 * | 10/2003 | Alexis ............ 709/229 |
| 2004/0128367 | A1 | 7/2004 | Piercy et al. |

OTHER PUBLICATIONS

Office Action mailed on May 5, 2010 for U.S. Appl. No. 10/956,175, 31 pages.
Office Action mailed on Jan. 3, 2011 for U.S. Appl. No. 10/956,175, 30 pages.
Notice of Allowance mailed on Aug. 3, 2011 for U.S. Appl. No. 10/956,175, 5 pages.
Notice of Allowance, U.S. Appl. No. 10/955,671, dated May 5, 2009, 8 pages.
Office Action mailed on Jan. 7, 2009 for U.S. Appl. No. 10/956,175, 22 pages.
Office Action mailed on Jun. 20, 2008 for U.S. Appl. No. 10/956,175, 21 pages.
Office Action Response mailed Oct. 20, 2008 for U.S. Appl. No. 10/956,175, 32 pages.
Office Action mailed on Sep. 4, 2007 for U.S. Appl. No. 10/955,671, 12 pages.
Office Action Response mailed Dec. 4, 2007 for U.S. Appl. No. 10/955,671, 11 pages.
Office Action mailed on Mar. 11, 2008 for U.S. Appl. No. 10/955,671, 5 pages.
Office Action Response mailed Jun. 4, 2008 for U.S. Appl. No. 10/955,671, 13 pages.
Notice of Allowance mailed on Aug. 21, 2008 for U.S. Appl. No. 10/955,671, 7 pages.
Notice of Allowance mailed on Dec. 30, 2008 for U.S. Appl. No. 10/955,671, 6 pages.
Office Action mailed on Jul. 19, 2011 for U.S. Appl. No. 12/542,653, 9 pages.
Notice of Allowance mailed on Oct. 20, 2011 for U.S. Appl. No. 12/542,653, 7 pages.
Office Action mailed on Jul. 22, 2009 for U.S. Appl. No. 10/956,175, 29 pages.
Office Action Response mailed May 7, 2009 for U.S. Appl. No. 10/956,175.
Notice of Allowance, U.S. Appl. No. 10/956,175, dated Mar. 21, 2012, 9 pages.
Droms, R., "Dynamic Host Configuration Protocol," Network Working Group, Mar. 1997, 45 pp.
Patrick, M., "DHCP Relay Agent Information Option," Network Working Group, Jan. 2001, 14 pp.

* cited by examiner

| Client ID | IP Address | MAC | Lease Time | Circuit Info | DHCP ID | GI Address |
|---|---|---|---|---|---|---|
| ... | ... | ... | ... | ... | ... | ... |

```
context service-1
dhcp relay server 192.168.1.100
dhcp relay option
interface subscribers multibind
     ip-address 10.10.1.1/24
     dhcp proxy
interface management
     ip-address 192.168.1.1/24
subscriber name sub1
     password test
     dhcp max-addrs 1
subscriber name sub2
     password test
     dhcp max-addrs 1
context service-2
. . .

port atm 2/1
     no shutdown
     atm pvc 1:32 profile vbr-nrt encapsulation
bridge1483
     bind subscriber sub1@service-1
atm pvc 1:33 profile vbr-nrt encapsulation bridge1483
     bind subscriber sub2aservice-1
. . .
```

FIG. 8A

```
context local
  interface dhcp
    ip-address 192.168.1.1/24
!
ip route 10.1.1.1/32 context service-1
ip route 10.2.1.1/32 context service-2
!
context service-1
  dhcp relay server 192.168.1.100
  dhcp relay option
  interface subscribers multibind
    ip-address 10.10.1.1/24
    dhcp proxy
  interface management loopback
    ip-address 10.1.1.1/32
    ip source-address dhcp
  subscriber name sub1
    password test
    dhcp max-addrs 1
  subscriber name sub2
    password test
    dhcp max -addrs 1
. . .
  ip route 192.168.1.0/24 context local
context service-2
  dhcp relay server 192.168.1.100
dhcp relay option
interface subscribers multibind
    ip-address 10.10.2.1/24
    dhcp proxy
interface management loopback
    ip-address 10.2.1.1/32
    ip source -address dhcp
  subscriber name sub1
    password test
    dhcp max-addrs 1
  subscriber name sub2
    password test
    dhcp max-addrs 1
. . .
ip route 192.168.1.0/24 context local
port atm 2/1
  no shutdown
  atm pvc 1:32 profile vbr-nrt encapsulation bridge1483
bind subscriber sub1@service-1
atm pvc 1:33 profile vbr-nrt encapsulation bridge1483
bind subscriber sub20service-1
...
port atm 2/2
  no shutdown
  atm pvc 1:32 profile vbr-nrt encapsulation bridge1483
bind subscriber sub1@service-2
atm pvc 1:33 profile vbr-nrt encapsulation bridge1483
  bind subscriber sub20service-2
...
```

FIG. 8B

DHCP PROXY IN A SUBSCRIBER ENVIRONMENT

CROSS-REFERENCE TO RELATED APPLICATIONS

This application is a continuation of U.S. application Ser. No. 10/956,175, filed Sep. 30, 2004, which claims the benefit of U.S. Provisional Application No. 60/516,541, filed Oct. 31, 2003, which are both hereby incorporated by reference.

FIELD OF THE INVENTION

The present invention relates generally to communications. More particularly, this invention relates to a network element acting as a DHCP proxy.

BACKGROUND OF THE INVENTION

In the field of communications, the need for high-speed transmission of data, including video and audio, has continued to increase. Moreover, there has been an increase in the selection of services by which users can connect to a network, such as the Internet. Specifically, Internet Service Providers (ISPs) may allow for connectivity to the Internet through lower-speed connections at different rates, such as 56 kilobits/second, by employing a Plain Old Telephone Service (POTS) line. Other choices for connection, which are at higher speeds, into a network can include Integrated Services Digital Network (ISDN), Digital Subscriber Line (DSL) service, and cable modem service over a Radio Frequency (RF) cable line. Further, other types of content providers may enable a subscriber to receive different types of media, such as a video stream, audio stream, etc.

In a typical DSL network, a network element supports a wide variety of features to facilitate the management, allocation and distribution of IP addresses. Normally, the subscriber profile can be configured locally on the network element or can be retrieved from a RADIUS (remote access dial in user server) remote server (e.g.). A subscriber profile determines how an IP address (and optionally the associated route for the subscriber LAN) would be provided to a certain subscriber.

Typically, a DHCP (dynamic host configuration protocol) server is responsible for allocating and assigning one or more IP addresses to one or more clients. FIG. 1 is a block diagram illustrating a typical network configuration. In this configuration, a network element 101 serves a relay agent with respect to DHCP server 102 for one or more clients 103 and 104. Typically, when client 103 desires to enter the network, client 103 sends a DHCP discovery broadcasts to network element 101. Network element 101 forwards the request to DHCP server 102. DHCP server 102 then returns an offer back to network element 101 which in turn forwards it back to client 103. When DHCP 102 assigns an IP address to client 103, DHCP 102 replies with a DHCP packet (e.g., a DHCPack) to client 103. When network element 101 forwards this DHCP reply to client 103, network element 101 installs an IP-host route and an ARP entry for the IP address assigned to client 103. Client 103 now has a valid IP address and it knows the IP address of the DHCP 102. Further communications between client 103 and DHCP 102, such as DHCP lease renewal and release, will take place between client 103 and DHCP 102 directly without substantially invoking network element 101.

However, since network element 101 may communicate and service thousands of clients. Each client may need to directly communicate with DHCP 102 for, for example, IP address renewal or release. DHCP 102 may also service other network elements, which may provide services for thousands of other clients. As a result, DHCP 102 may experience heavy traffic from all clients via all network elements.

An IP address may be explicitly released by the client or implicitly released through the expiration of the lease time. In either case, sub-released IP addresses should be available for allocation and assignment.

When client 103 releases the IP address back to DHCP 102, network element 101 has no knowledge whether the IP address has been released until network element 101 sees DHCP 102 assigns that IP address to another of network element's 101 clients. Instead, network element 101 keeps listening to the traffic associated with the IP address until network element 101 sees DHCP 102 assigns that IP address to another of network element's 101 clients. Thus, network element 101 may consider that the IP address is still in use even though client 103 has released the IP address (directly back to DHCP 102). In addition to the resources of network element 103 wasted on such listening, this approach may result in an under utilization of IP addresses where DHCP 102 is serially resulting the network elements. Specifically, where DHCP 102 is servicing multiple network elements, DHCP 102 cannot allocate and assign a released IP address to a first network element while a second network element is listening for that IP address (that is, since the second network element listening for the released IP address will not see the reallocation and assignment of that IP address to a client of the first network element. The second network element will not know to stop listening and problems arise if two network elements are listening for the same IP address). This restriction typically leads DHCP 102 to be configured to designate different blocks of IP address to different network elements; if a given network element needs additional IP addresses, DHCP 102 cannot give it IP addresses designated to another network element even if they are not being used.

In addition, DHCP 102 typically maintains all lease time information for all clients. As a result, every client's DHCP renewal or release has to be processed by DHCP 102, which significantly increases the overhead traffic of DHCP 102. Furthermore, since network element 101 has no knowledge when the lease time expires, network element 101 has to keep listening for the IP address associated with the expired lease. Since allowing a lease to expire has the same effect as a client explicitly releasing an IP address, listening to an IP address for which the lease has expired has the same disadvantages as those described above with regard to when a client explicitly releases an IP address.

SUMMARY OF THE INVENTION

Methods and apparatuses for a network element having DHCP proxy functionality are described. According to one embodiment, an exemplary method includes receiving, at a network element, a request for an IP address from a subscriber, in response to the request, on behalf of the subscriber, communicating with one or more IP address providers over a network to process the request, and responding to the subscriber with respect to the request as if the network element is an IP address provider, on behalf of the one or more IP address providers.

BRIEF DESCRIPTION OF THE DRAWINGS

The present invention is illustrated by way of example and not limitation in the figures of the accompanying drawings in which like references indicate similar elements.

FIG. 5 is a block diagram illustrating an exemplary data structure which may be used in one embodiment of the invention.

FIGS. 8A and 8B are diagrams illustrating exemplary codes for configuring a network element according to one embodiment of the invention.

DETAILED DESCRIPTION

Figure 1:
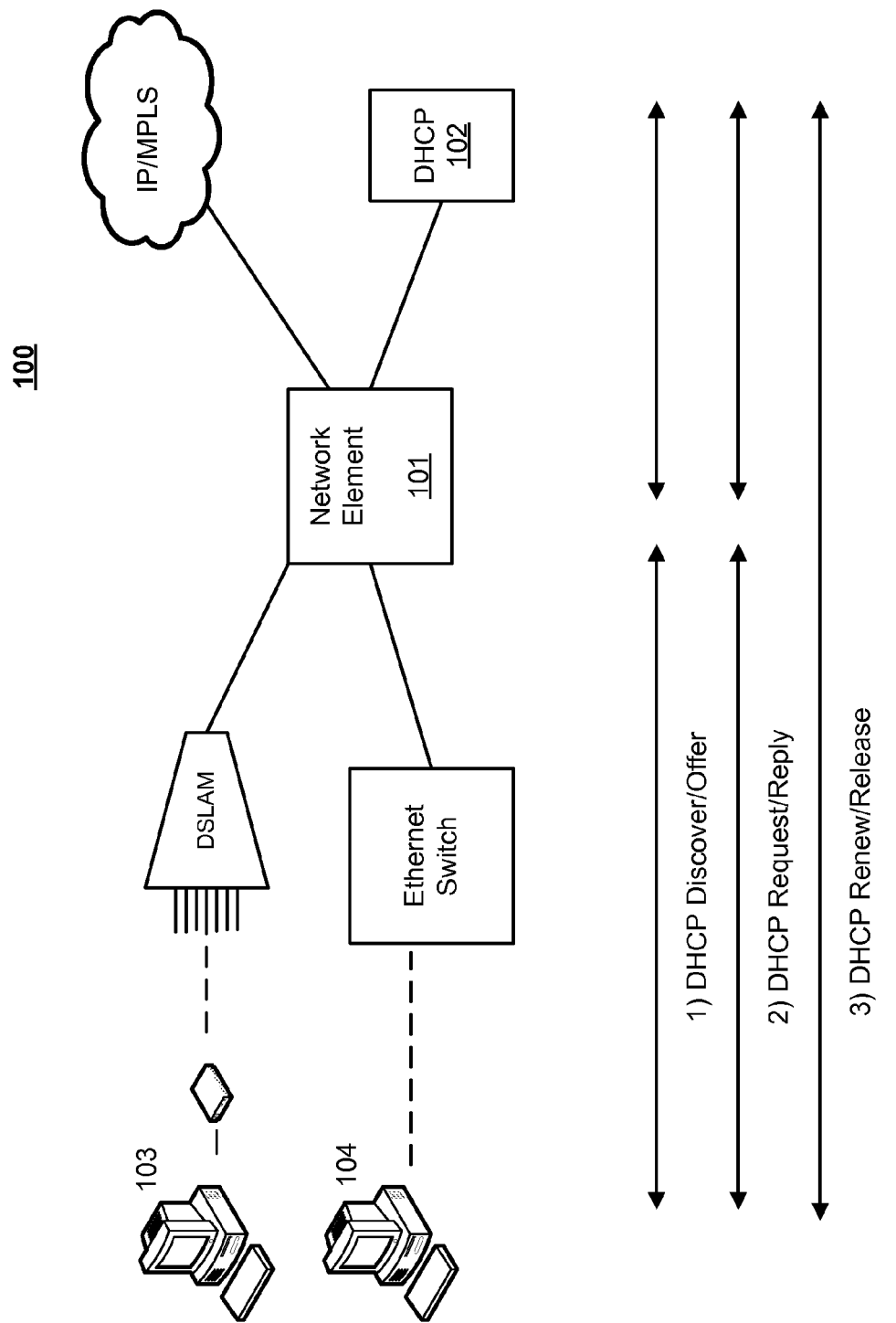
FIG. 1 is a diagram illustrating a typical network infrastructure.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent finite sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to one or more different apparatuses for performing the operations herein. This apparatus may be specially constructed for the required purposes (e.g., software, hardware, and/or firmware, etc.), or it may comprise a general purpose computer selectively activated or reconfigured by a computer program stored in the computer. The instructions of such software, firmware, and computer programs may be stored in a machine readable medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, electrical, optical, acoustical or other forms of prorogated signals (e.g., carrier waves, infrared signals, etc.) or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Methods and apparatuses for a network element having DHCP proxy functionality are described. In certain embodiments of the invention, a network element that connects clients to a DHCP server acts as a proxy for that DHCP server. In addition, certain of these embodiments allow the network element to: 1) acts as a DHCP proxy for multiple DHCP servers configured to provide redundancy; and/or 2) to facilitate the handling of lease renewals.

Figure 2:
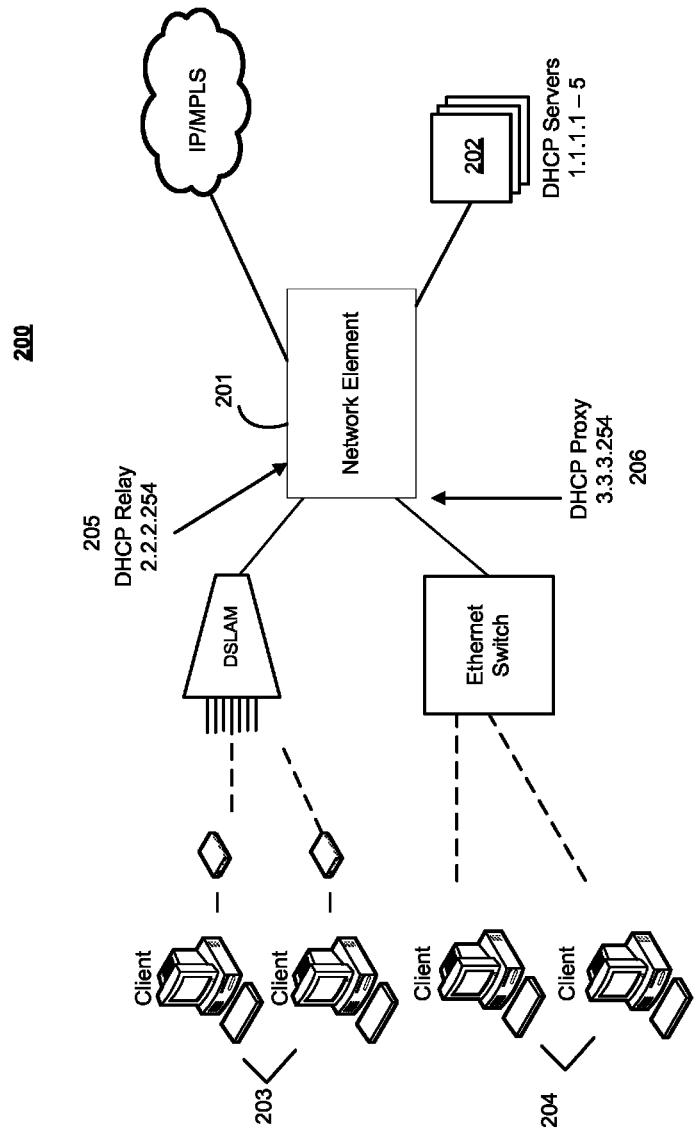
FIG. 2 is a diagram illustrating an exemplary network infrastructure according to one embodiment of the invention.

FIG. 2 is a block diagram illustrating an exemplary network configuration according to one embodiment of the invention. Referring to FIG. 2, according to one embodiment, exemplary network configuration 200 includes a network element 201 to communicate with one or more clients 203 and 204. Network element 201 includes a DHCP relay interface 205 for relaying DHCP requests to one of a set if one or more DHCP servers 202, similar to the one shown in FIG. 1. In addition, network element 201 includes a DHCP proxy interface for serving as a DHCP proxy on behalf of DHCP servers 202. In this embodiment, clients 203 communicate via DHCP relay interface of network element 201 with one of DHCP servers 202. After acquiring IP addresses from DHCP servers 202, clients 203 directly communicate with one of the DHCP servers 202 without involving DHCP relay interface 205 of network element 201. That is, when clients 203 communicate with DHCP 202, clients 203 will specify DHCP 202's IP address as its destination IP address (e.g., 1.1.1.1-1.1.1.5) in a communication packet, instead of DHCP relay interface's IP address (e.g., 2.2.2.254).

However, clients 204 communicate with proxy interface 206 of network element 201, which in turn communicates with DHCP servers 202. In this case, proxy interface 206 serves as a proxy of DHCP 202. That is, proxy interface 206 acts as a DHCP server on behalf of DHCP servers 202. When clients 204 communicate with a DHCP server, clients 204 will specify DHCP proxy interface's IP address (e.g., 3.3.3.254) as its destination IP address instead of DHCP 202's IP address (e.g., 1.1.1.1-1.1.1.5), because clients 204 consider that proxy interface 206 is the DHCP server they are communicating with.

Since network element 201 serves as a proxy on behalf of one or more DHCP servers 202 having IP addresses from, for example, 1.1.1.1 to 1.1.1.5, network element 201 can maintain multiple DHCP servers and some of which may be used as redundant DHCP servers for backup purposes, which will be described in details further below. In addition, since network element 201 knows which subscriber is assigned with an IP address from which DHCP server, network element 201 may maintain lease time for each subscriber, which will be described in details further below. As a result, when a client releases its IP address back to network element 201 (since the client thinks network element 201 is the DHCP server), network element 201 knows that IP address has been released and network element 201 does not have to keep listening to the traffic of the released IP address. In addition, where DHCP servers 202 service multiple network elements, a reloaded IP address may be reassigned to another subscriber of another network element. Note that DHCP relay interface 205 of network element 201 is not required for network element 201 to operate, particularly to include a DHCP proxy interface.

Figure 3:
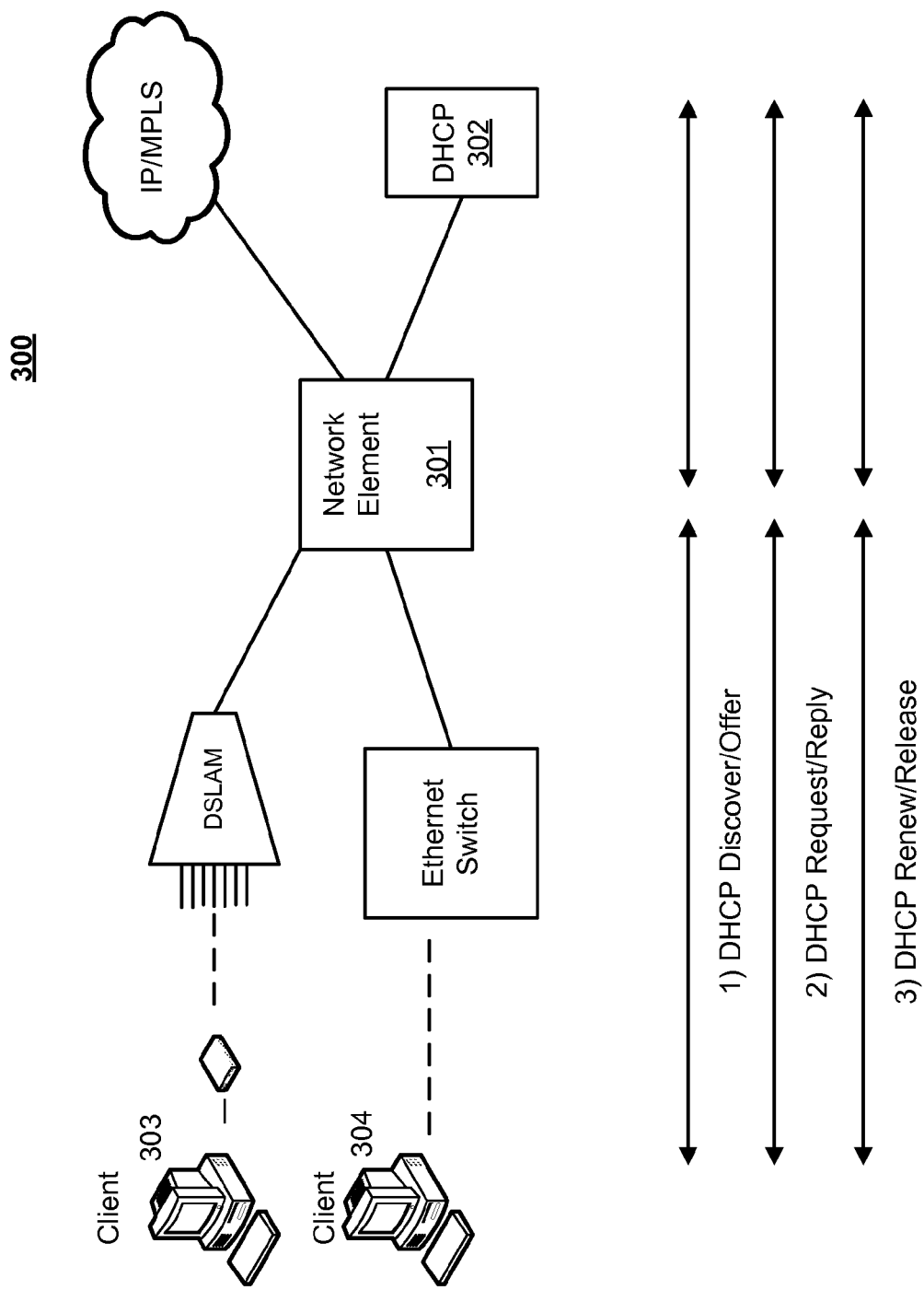
FIG. 3 is a flow diagram illustrating an exemplary process for processing a request for an IP address according to one embodiment of the invention.

FIG. 3 is a diagram illustrating an exemplary network configuration according to one embodiment of the invention. In this embodiment, referring to FIG. 3, exemplary network configuration 300 includes network element 301 having an interface to serve as a DHCP proxy on behalf of DHCP server 302 to provide DHCP services to one or more clients 303 and 304. The interface having DHCP proxy functionality may be implemented as proxy interface 206 of FIG. 2. According to one embodiment, when client 303 requests for a DHCP service, client 303 sends a DHCP discovery broadcasts to network element 301. Network element 301 forwards the message to DHCP server 302 and the DHCP offer and request processes take place via network element 301. When DHCP 302 assigns an IP address to client 303, DHCP 302 replies with a DHCP packet, such as a DHCPack, which is received by network element 301. Prior to network element 301 forwarding this DHCP reply packet to client 303, network element 301 changes DHCP IP address in the packet, from DHCP 302's IP address to network element 301's IP address. In addition, network element 301 installs an IP-host route and an ARP entry for the IP address assigned to client 303. Thereafter, client 303 has a valid IP address and client 303 knows the IP address of network element 301, and considers network element 301 as a DHCP server. Subsequently, client 303 may further communicate with network element 301 as a DHCP server for, for example, the DHCP renewal or release.

Note that both the DHCP relay and proxy functionality may work with either a "bind interface" or a "bind subscriber" statement. The "bind interface" can be considered as a non-subscriber mode where AAA (authorization, authentication, and accounting) is not involved, and a "bind subscriber" can be considered as a subscriber mode where AAA is involved for accounting purpose.

Figure 4A:
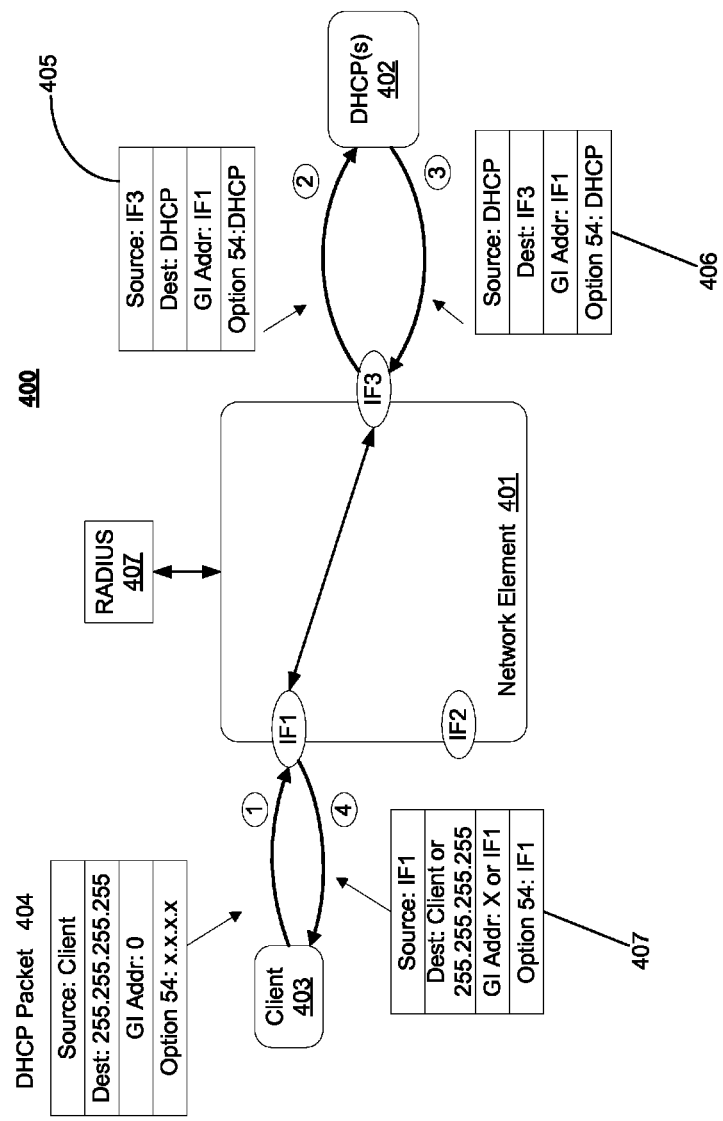
FIG. 4A is a block diagram illustrating an exemplary process for processing a request for an IP address according to one embodiment of the invention.

FIG. 4A is a block diagram illustrating an exemplary DHCP process according to one embodiment of the invention. Exemplary process 400 may be implemented in exemplary network configuration 300 of FIG. 3. In one embodiment, network element 401 includes a DHCP proxy functionality to enable at least one interface, such as interface IF1, to serve as a DHCP proxy to client 403 on behalf of DHCP 402. Client 403 considers interface IF1 of network element 401 is the DHCP server for the client.

Referring to FIG. 4A, when client 403 broadcasts a DHCP broadcast message, client 403 sends a broadcast packet 404 in a network. In one embodiment, packet 404 includes, but not limited to, a source IP address (e.g., the IP address of client 403 or 0.0.0.0) and destination IP address is 255.255.255.255 indicating this message is a broadcast message. Since this is a DHCP broadcast message, the GI address and option 54 fields are irrelevant. When network element 401 receives packet 404, network element 401 may perform optional AAA processes with RADIUS 407, particularly when the DHCP proxy functionality is configured as per subscriber basis. Then network element 401 forwards the packet to an outlet interface IF3 which will forward the packet to the DHCP 402. Before transmitting the packet to IF3, network element 401 modifies the packet (e.g., packet 405). In one embodiment, network element 401 replaces the source IP address of the packet with the outlet interface IF3's IP address and the destination IP address with the DHCP 402's IP address. In addition, network element 401 may set the GI address field as the inlet interface IF1's IP address and the option 54 field as DHCP 402's IP address. Furthermore, (e.g., if client 403 does not specify option 82 field of the packet 404, always, etc.) network element may fill in the circuit information in the option 82 field, such as, for example, the slot number, the port number, and/or the PVC ID, etc.

When DHCP 402 receives forwarded broadcast message 405, DHCP 402 returns an offer message 406 back to IF1 via IF3 of network element 401. In one embodiment, DHCP 402 specifies, in return packet 406, its IP address as the source IP address, IF1's IP address as a destination IP address. In addition, DHCP 402 specifies IF1's IP address as a GI address in the packet and its IP address in the option 54 field. When network element 401 receives packet 406, it modifies the packet (e.g., packet 407). In one embodiment, the modification includes replacing the source IP address with IF1's IP address which indicates that IF1 of network element 401 is the DHCP with respect to client 403. In addition, network element 401 may change the GI address to the IF1's IP address and changes the option 54 field as the IF1's IP address. Furthermore, if network element 401 modified the option 82 field when it received the DHCP broadcast message, network element 401 may strip off the option 82 field when it forwards the offer packet 407 back to client 403.

Thereafter, during the subsequent communications, such as, DHCP request or DHCP release, client 403 may use the IP address of interface IF1 of network element 401 as a destination IP address and IF1's IP address as the DHCP server address in the option 54 field, because client 403 was "told" that interface IF1 of network element 401 is the DHCP server when it received the DHCP offer. FIG. 5 is a block diagram illustrating an exemplary data structure maintained by a network element according to one embodiment of the invention, in order to accomplish the processes described above.

Thus, since network element 401 serves as a DHCP proxy on behalf of DHCP 402, according to one embodiment, multiple DHCP servers may be maintained without the knowledge of client 403. At least one of the multiple DHCP servers may serve as a redundant DHCP server. In addition, according to another embodiment, network element 401 may maintain lease time information for client 403 since network element operates as a DHCP server with respect to client 403. As a result, the subsequent DHCP renewal or release may be partially or fully handled by network element 401 without invoking DHCP 402 which greatly reduces traffic to DHCP 402.

Figure 4B:
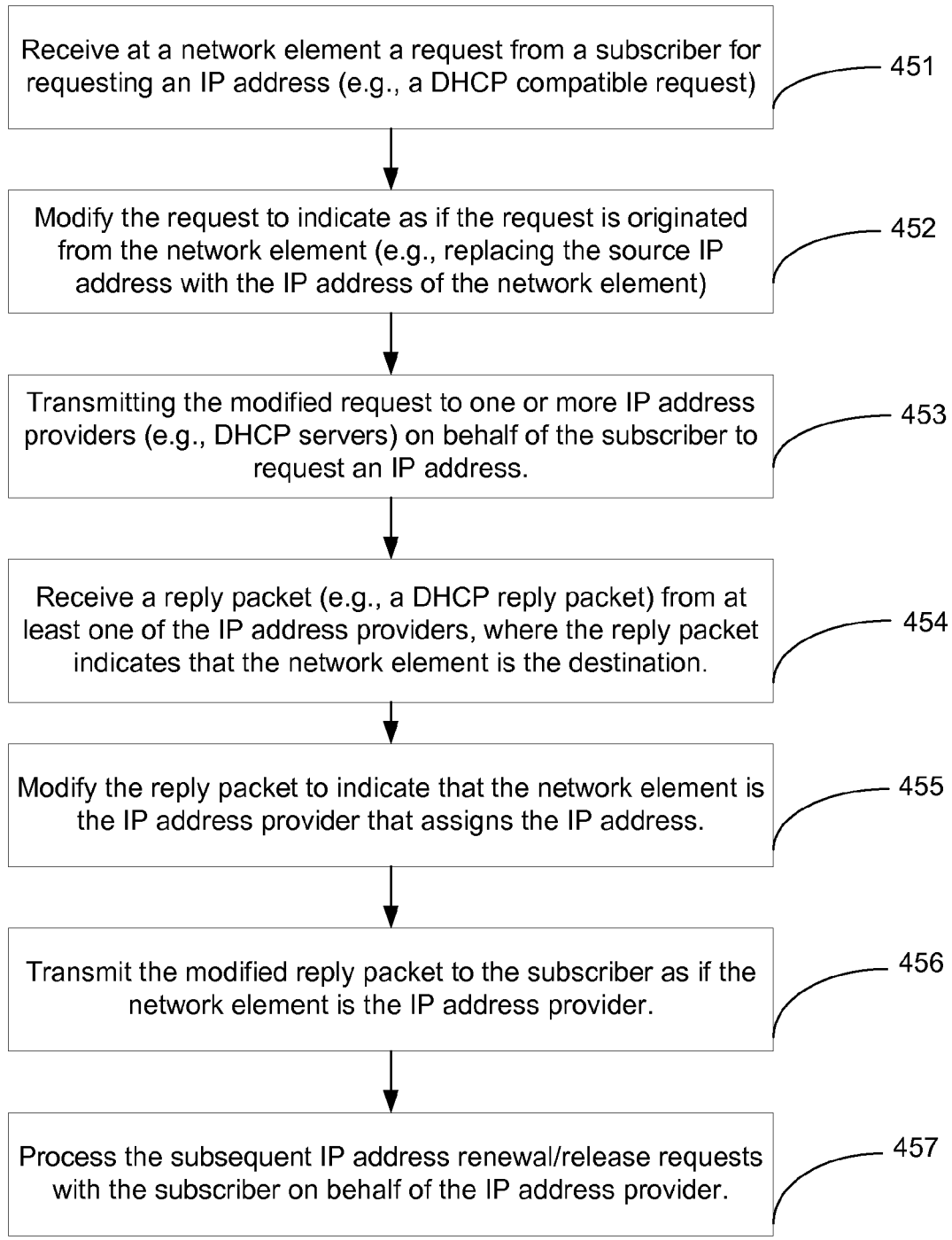
FIG. 4B is a flow diagram illustrating an exemplary process for processing a request for an IP address according to another embodiment of the invention.

FIG. 4B is a flow diagram illustrating an exemplary process for process a request for an IP address in accordance with one embodiment of the invention. Exemplary process 450 may be performed by a processing logic that may comprise hardware (circuitry, dedicated logic, etc.), software (such as is run on a dedicated machine), or a combination of both. For example, the exemplary process 450 may be performed by a network element, such as, network elements 201, 301, and 401. In one embodiment, exemplary process 450 includes, but is not limited to, receiving, at a network element, a request for an IP address from a subscriber, in response to the request, on behalf of the subscriber, communicating with one or more IP address providers over a network to process the request, and responding to the subscriber with respect to the request as if the network element is an IP address provider, on behalf of the one or more IP address providers.

Referring to FIG. 4B, at block 451, a request for an IP address is received by a network element from a subscriber subscribing network services provided from one or more service providers. In one embodiment, the request is a DHCP compatible request, such as, for example, packet 404 of FIG. 4A.

In response to the request, at block 452, the network element may modify the request to indicate as if the request is originated from the network element. For example, the network element may replace the source IP address with the IP address of the network element. The network element may further modify the destination IP address of the packet using a destination IP address of an IP address provider (e.g., DHCP server). Other fields of the packet may also be modified. The modified packet may be similar to packet 405 of FIG. 4A.

At block 453, the modified packet is transmitted from the network element to the selected IP address provider on behalf of the subscriber. That is, the modified packet is transmitted from the network element to the selected IP address provider as if the network element is the source and the client of the IP address provider.

In response to the modified request received by the selected IP address provider, at block 454, a reply packet is received by the network element from the IP address provider. The reply packet indicates that the network element is the destination of the reply packet, because the original modified packet indicates that the network element is the source of the request.

At block 455, the network element may modify the reply packet to indicate that the network element is the source of the reply packet (e.g., the IP address provider that assigns the IP address). In one embodiment, the network element replaces the destination using the identity of the subscriber, which was obtained via the original IP address request. The network element may further specify in the source of the reply packet using an identity of the network element (e.g., IP address of the network element).

At block 456, the modified reply packet is transmitted from the network element to the subscriber as if the network element is the IP address provider that assigns the IP address. Thereafter, at block 457, the network element processes the subsequent IP address related services with the subscriber on behalf of the IP address provider. Other operations may also be performed.

According to one embodiment, a network element having functionality described above may be configured via at least one of the following commands:

| Command | [no] dhcp relay server ip-addr |
|---|---|
| Command Mode | Context configuration |
| Default Behavior | no dhcp relay is configured |

This command enables the DHCP relay and proxy functionality in a context. According to one embodiment, all DHCP requests received on interfaces in this context will be forwarded to the external DHCP sever with specified IP address.

| Command | [no] dhcp relay option |
|---|---|
| Command Mode | Context configuration |
| Default Behavior | no dhcp relay option |

This command will enable the sending of DHCP options in all DHCP packets being relayed from this context of the network element.

| Command | [no] dhcp {relay | proxy} [size <max-num>] |
|---|---|
| Command Mode | Interface configuration |
| Default Behavior | no, relay/proxy is disabled on the interface |

These commands will enable or disable either DHCP relay or proxy on a specific interface. It also sets the maximum number of DHCP IP address available on this interface via the size <max-num> option. The max-num can be configured between 1 and 65,535.

| Command | Ip source-address {dhcp} |
|---|---|
| Command Mode | Interface configuration |
| Default Behavior | no DHCP source-address is configured |

This command works with DHCP packets sourced from a network element. It is important that the IP address is controlled with which the network element is acting as a DHCP server in the proxy configuration. If "ip source-address" is not configured the interface ip-address from where the packet is transmitted is used as source address, but in applications where only one DHCP address is used in a network element, and intercontext routing is enabled, it becomes important that each context is uniquely identified by a single source-address.

| Command | [no] dhcp max-addrs max-num |
|---|---|
| Command Mode | Subscriber configuration |
| Default Behavior | no (max-num = 0), which will say subscriber cannot use DHCP to obtain an IP address |

This command configures a maximum number of IP addresses this subscriber can request via the DHCP protocol. A DHCP max-addrs>0 may be configured in the subscriber profile to allow this subscriber to use the DHCP protocol to get a dynamic IP address. The maximum address size may be configured between 1 and 255, according to one embodiment.

| Command | [no] debug dhcp-relay packet |
|---|---|
| | [no] debug dhcp {all | mac = hh:hh:hh:hh:hh:hh | packet |relay |
| Command Mode | Exec(10) |

These commands may be used for debugging purposes.

| Command | show dhcp relay server |
| Command Mode | Exec(10) |

This command displays information regarding the configured DHCP server.

| Command | show dhcp relay hosts |
| Command Mode | Exec(10) |

This command displays all the IP-hosts learnt by the relay/proxy functionality and the known information such as lease time.

| Command | show dhcp relay shmem |
| Command Mode | Exec(10) |

This command displays all the IP-hosts learnt by the relay/proxy functionality and written to the file/microdrive.

Figure 6:
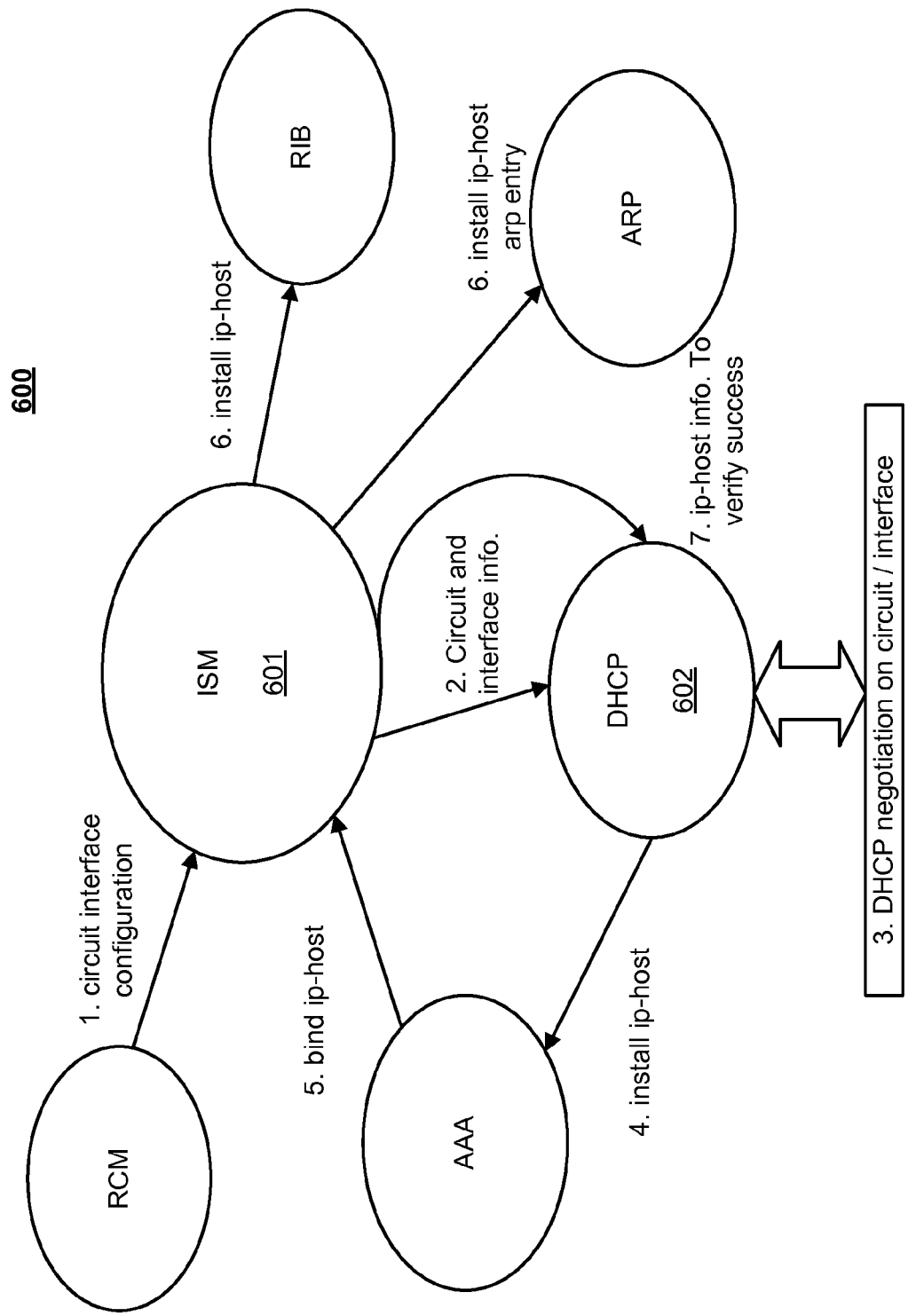
FIG. 6 is a block diagram illustrating an exemplary information flow within a network element according to one embodiment of the invention.

According to one embodiment, the DHCP server states are preserved within a network element, which may be used by the relay and/or proxy functionality of the network element. FIG. 6 is a state diagram illustrating an exemplary information flow within a network element according to one embodiment of the invention. In one embodiment, referring to FIG. 6, an interface state manager (ISM) 601 on the XCRP is running in a "hot" mode between a primary and a secondary XCRP, and ISM 601 is the main responsible for state replication. Meanwhile, DHCP demon 602 writes DHCP state to the micro-drive for every DHCP IP address entry, such as, for example, IP address, MAC address, create time, lease time, circuit information (e.g., slot, port, VPI, and VCI, etc.), which may be stored in a data structure, such as data structure 500 shown in FIG. 5, also referred to as a DHCP preserve state file.

In one embodiment, DHCP state preservation information may be used in at least one of the following situations:

| | |
|---|---|
| Process Restart | DHCP preserve state file on micro-drive is read, but ISM information has higher priority |
| Power Cycle | DHCP preserve state file is read and has priority over ISM information |
| XCRP Switchover | DHCP preserve state is created from the "hot" running ISM module on the secondary XCRP, and from this information is the preserve state file written to the new micro-drive |

According to one embodiment, DHCP demon 602 removes a dynamic DHCP IP address from a circuit in at least one following situations and sends an RADIUS accounting stop record:

| Network Element Event | DHCP Relay | DHCP Proxy |
|---|---|---|
| Circuit delete | Yes | Yes |
| IP address given to another circuit | Yes | Yes |
| DHCP lease time expired | No | Yes |

Figure 7A:
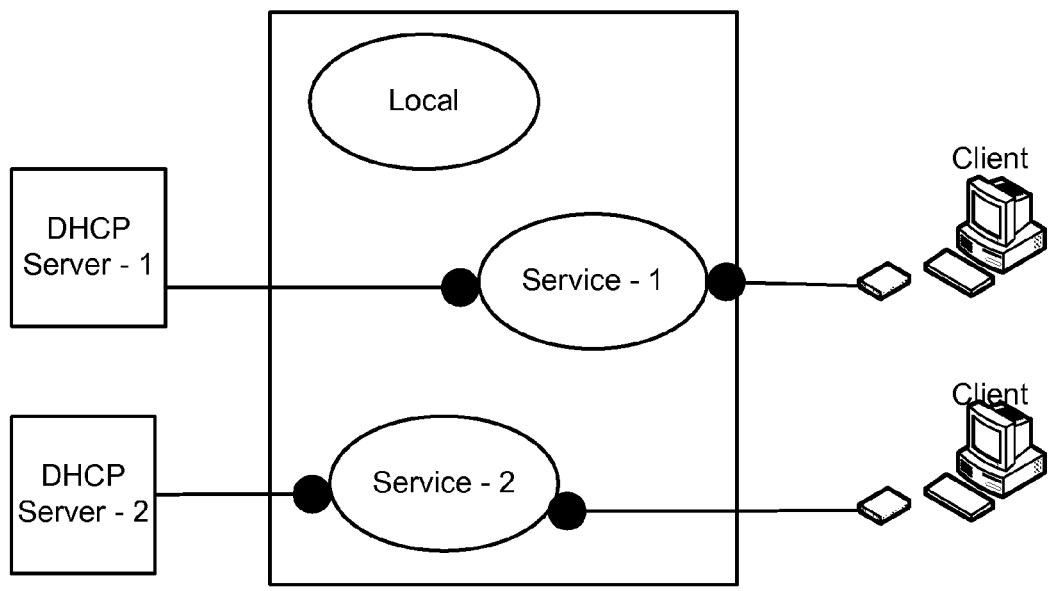
FIGS. 7A and 7B are block diagrams illustrating exemplary configurations of a network element according to one embodiment of the invention.

FIG. 7A is a block diagram illustrating an exemplary network configuration according to one embodiment of the invention. In this embodiment, each context is deployed with individual DHCP servers. An exemplary configuration program associated with the network configuration of FIG. 7A is shown in FIG. 8A.

Figure 7B:
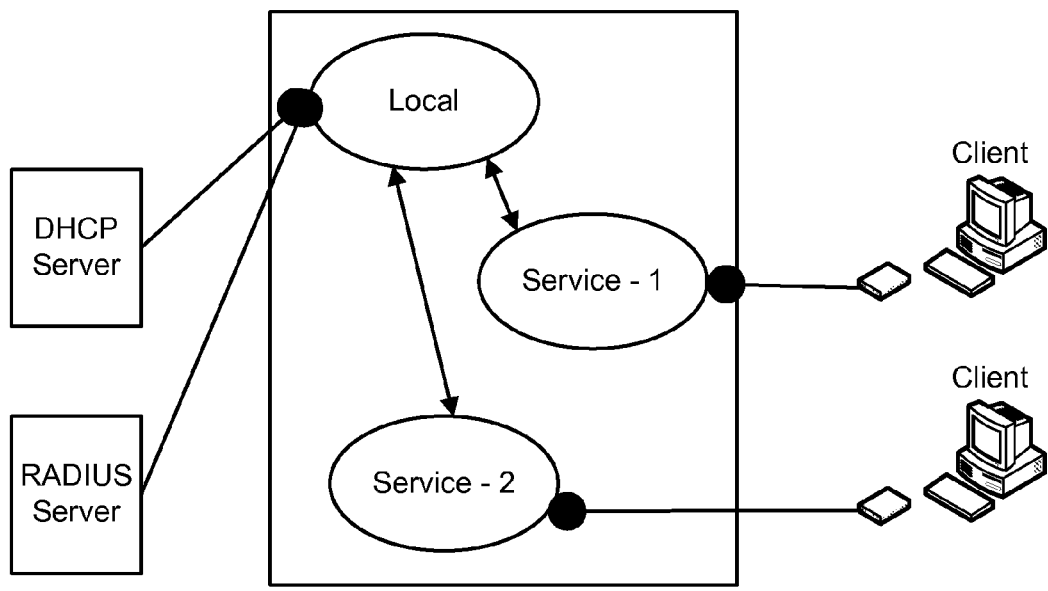

FIG. 7B is a block diagram illustrating an exemplary network configuration according to one embodiment of the invention. In this embodiment, a global DHCP server, which will service multiple contexts and using intercontext routing to reach the global DHCP server from the individual service contexts. An exemplary configuration program associated with the network configuration of FIG. 7B is shown in FIG. 8B.

Figure 9:
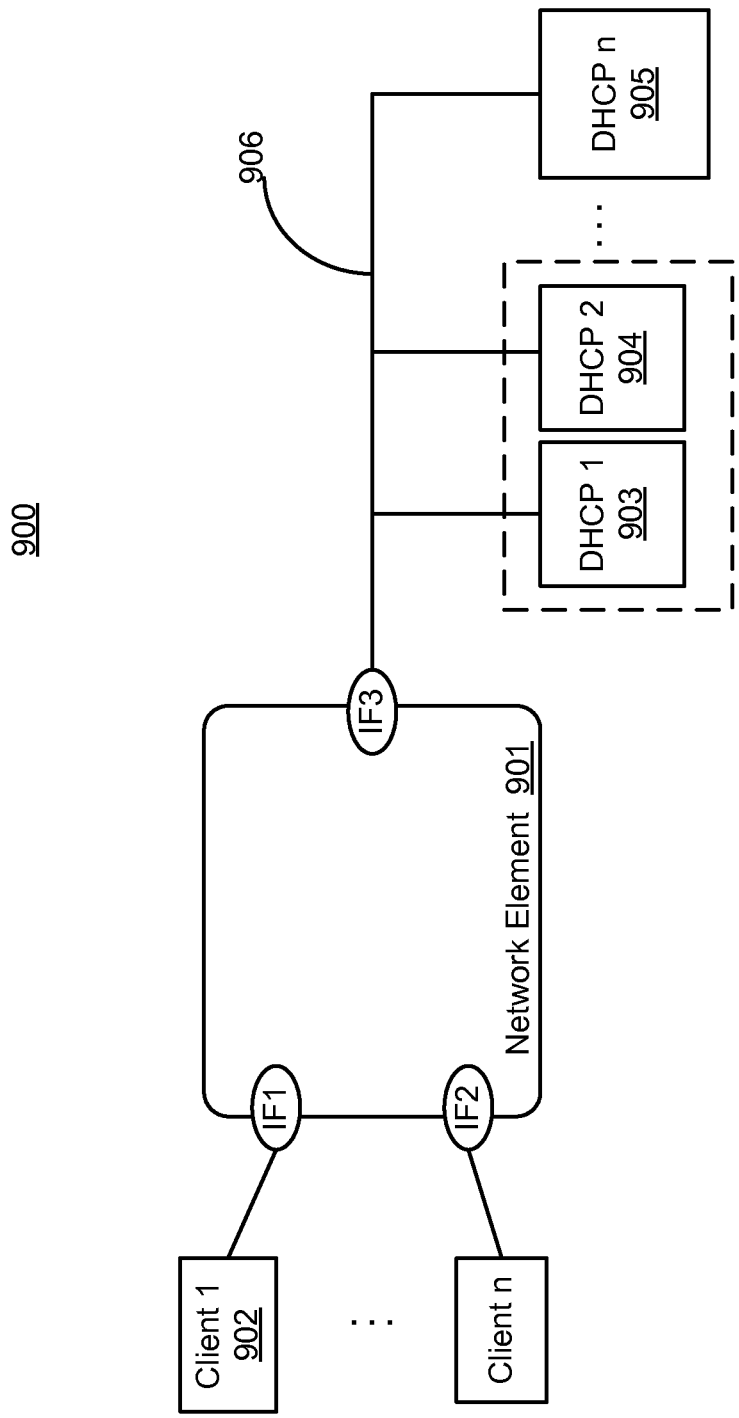
FIG. 9 is a block diagram illustrating an exemplary network configuration having redundant DHCP servers according to one embodiment of the invention.

As described above, when a network element's DHCP proxy functionality is activated, all clients connected to the network element would consider the network element as a DHCP server. As a result, multiple DHCP servers may be implemented behind the network element without the knowledge of the clients. FIG. 9 is a block diagram illustrating an exemplary network configuration according to one embodiment of the invention. Referring to FIG. 9, in one embodiment, network element 901 includes, but not limited to, an interface IF1 serving as a DHCP proxy on behalf of multiple DHCP servers 903-905. However, client 902 only considers network element 901 as the DHCP server. According to one embodiment, DHCP 904 may serve as a redundant DHCP server for DHCP 903. When DHCP 903 is not operating, DHCP 904 may take over on behalf of DHCP 903.

In one embodiment, network element maintains information regarding which interface or client is serviced by which DHCP server. In addition, multiple DHCP servers may share the same IP address pool, such that when the primary DHCP is down, the secondary DHCP may take over using the same IP address pool without causing conflicts. For example, DHCP 903 and DHCP 904 may be configured as a redundant DHCP server pair and they may share the same IP address pool. When DHCP 903 is down, DHCP 904 may take over immediately since DHCP 904 knows the IP address allocation performed by DHCP 903.

Furthermore, according to one embodiment, network element 901 may monitor the activities of all DHCP servers on a per client basis for renewal or release. In a particular embodiment, network element 901 may maintain DHCP servers on a per interface basis, such as, per GI address basis.

According to one embodiment, a network element having DHCP redundant functionality described above may be configured via at least one of the following commands:

| Command | [no] dhcp relay server ip-addr [giaddr ip-addr] |
| Command Mode | Context configuration |
| Default Behavior | no dhcp relay server is configured, but if a DHCP server is configured, then by default the primary IP-address of the interface is used as the giaddr |

This command enables DHCP relay and proxy functionality in this context. All DHCP requests received on interfaces in this context will be forwarded to an external DHCP server with IP-address x.x.x.x. This command may be used multiple times to configure up to a predetermined number (e.g., five) of DHCP servers per context. The giaddr option is used to specify what IP-address to use in the DHCP packets' giaddr field.

| Command | [no] dhcp timeout timeout |
| Command Mode | Context configuration |
| Default Behavior | Timeout interval is 10 seconds |

This command sets the maximum time the network element is to wait for a response from a DHCP server before assuming that a packet is lost, or that the DHCP server is unreachable.

| | |
|---|---|
| Command | [no] dhcp algorithm {first \| round-robin} |
| Command Mode | Context configuration |
| Default Behavior | The network element queries the first configured server first |

This command configures the algorithm to be used among multiple DHCP servers.

| | |
|---|---|
| Command | [no] dhcp deadtime interval |
| Command Mode | Context configuration |
| Default Behavior | The network element considers a non-response DHCP server for dead in 5 minutes |

This command configures the time the network element will consider a non-responsive DHCP server as dead, and will not revert to and try the DHCP server again until the timeout has expired (unless all other DHCP servers are also non-responsive).

Since the DHCP server implementation often is centralized in a network element as well as Wi-Fi networks, it can be a considerable traffic overhead as well as place a big burden on the DHCP servers if DHCP lease timers are configured in the minutes for a large amount of subscribers. For example, referring to FIG. 2, clients 203 communicate with DHCP servers 202 directly via a DHCP relay interface of network element 201 for renewal and release of IP addresses. If clients 203 include thousands of clients and each of those clients has an IP address having a relatively short time leased from DHCP 202, the overhead traffic incurred on DHCP 202 would be significantly large. In addition, since network element 201 is involved in a relay mode, network element 201 has no knowledge whether an IP address has been released since the respective client directly releases the IP address back to DHCP 202 without involving network element 201. As a result, network element 201 keeps listening the traffic associated with that IP address even though it may be already released. Furthermore, when another client requests for an IP address, that released IP address cannot be assigned by network element 201 because network element 201 may still think that IP address has not been released yet.

However, if network element 201 maintains the lease time of IP addresses for its clients, the renewal and release of the IP addresses may be handled by network element 201 without invoking DHCP 202. For example, according to one embodiment, when client 204 initially requests for an IP address, thinking that network element 201 is the DHCP server, network element 201 requests an IP address from DHCP 202 on behalf of client 204 with relatively large block of lease time, which may be larger than the one requested by client 204. When network element 201 forwards the allocated IP address to client 204, network element 201 allocates the requested lease time from the relatively large block of lease time allocated from DHCP 202 and assigned to client 204.

Subsequently, according to one embodiment, when client 204 requests a renewal of the IP address, network element 201 checks the remaining relatively large block of lease time corresponding to the IP address of client 204 to determine whether the remaining lease time of the block is grater than or equal to the requested lease time for renewal, if so, network element 201 allocates again from the larger block of lease time maintained by the network element to the client without involving DHCP 202. These renewal processes do not involve DHCP 202 until some threshold amount of lease time remains in the block of lease time (e.g.,) there is not enough lease time remaining in the block of lease time, in which case, network element 201 may request for another relatively large block of time from DHCP 202. As a result, the overhead traffic incurred on DHCP 202 has been greatly reduced.

In addition, when client 204 releases the IP address, network element 201 knows when the IP address has been released and it may in turn release the IP address back to DHCP 202 and stop listening to the traffic associated with the released IP address.

Figure 10:
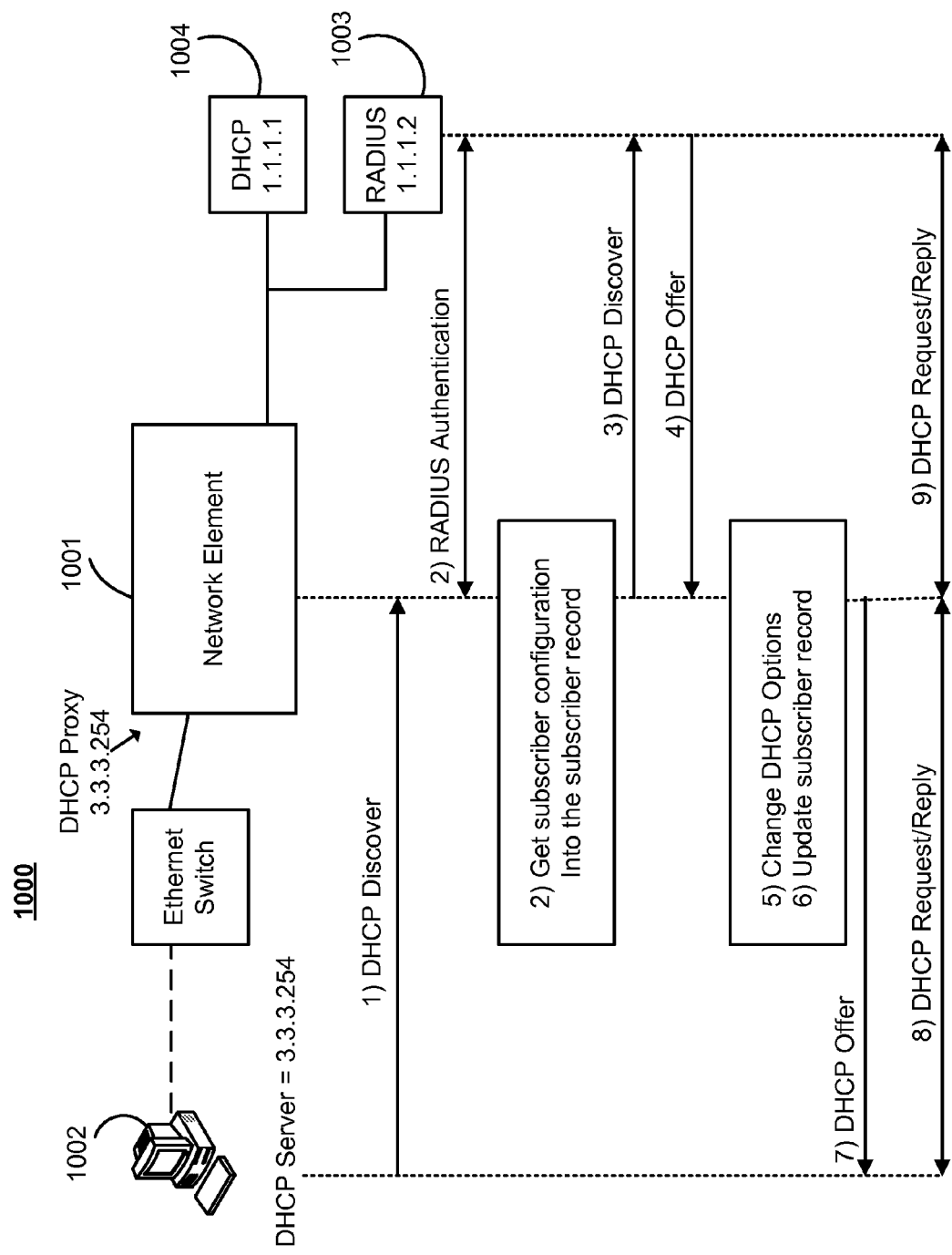
FIG. 10 is a flow diagram illustrating an exemplary process for DHCP discovery according to one embodiment of the invention.

FIG. 10 is a flow diagram illustrating an exemplary process for DHCP discovery according to one embodiment of the invention. Referring to FIG. 10, according to one embodiment, when network element 1001 receives a DHCP discovery request from client or subscriber 1002, network element 1001 authenticates client 1002 for a valid connection via RADIUS 1003. The subscriber record with subscriber specific options and parameters, including, for example, the "idle timer" is read either from RADIUS 1003 or from a local subscriber database. In a CLIPS case, the MAC address of the subscriber may be used as the subscriber's ID. In a "bind subscriber" case, the subscriber name is known from the binding processes. When subscriber 102 is authenticated, the DHCP discovery packet is forwarded to DHCP server 1004 in the context where the subscriber is terminated. In response, a DHCP offer is received at network element 1001 from DHCP 1004, including, but not limited to, DHCP options, such as the lease time. In one embodiment, the lease time in the DHCP offer received from DHCP 1004 is relatively larger than the lease time requested by client 1002.

According to one embodiment, network element 1001 changes the DHCP options, such as the lease time to reflect the subscriber 1002 specification configuration (e.g., lowest value of the subscriber idle timer and the DHCP server applied lease time. Network element 1001 may also store the DHCP server 1004's lease time in the subscriber record maintained by the network element for future use. Thereafter the DHCP offer packet is forwarded to subscriber 1002. Subsequently, when subscriber 1002 sends a DHCP request to network element 1001, thinking that the network element is the DHCP server, network element 1001 forwards the DHCP request packet to DHCP 1004 and receives a DHCP reply packet from the DHCP 1004. Network element 1001 modifies the DHCP options again to reflect the same values as in the offer packet, before sending it to subscriber 1002.

According to one embodiment, network element 1001 maintains two "lease times" for subscriber 1002. One is the lease time received from DHCP 1004, which is needed for the network element to know when a DHCP renewal requires to be forwarded to DHCP 1004. The other one is the actual lease time of subscriber 1002, which indicates when it is safe for the network element to give a local response to the subscriber renewal request without invoking the DHCP server. Other operations may be included.

Figure 11:
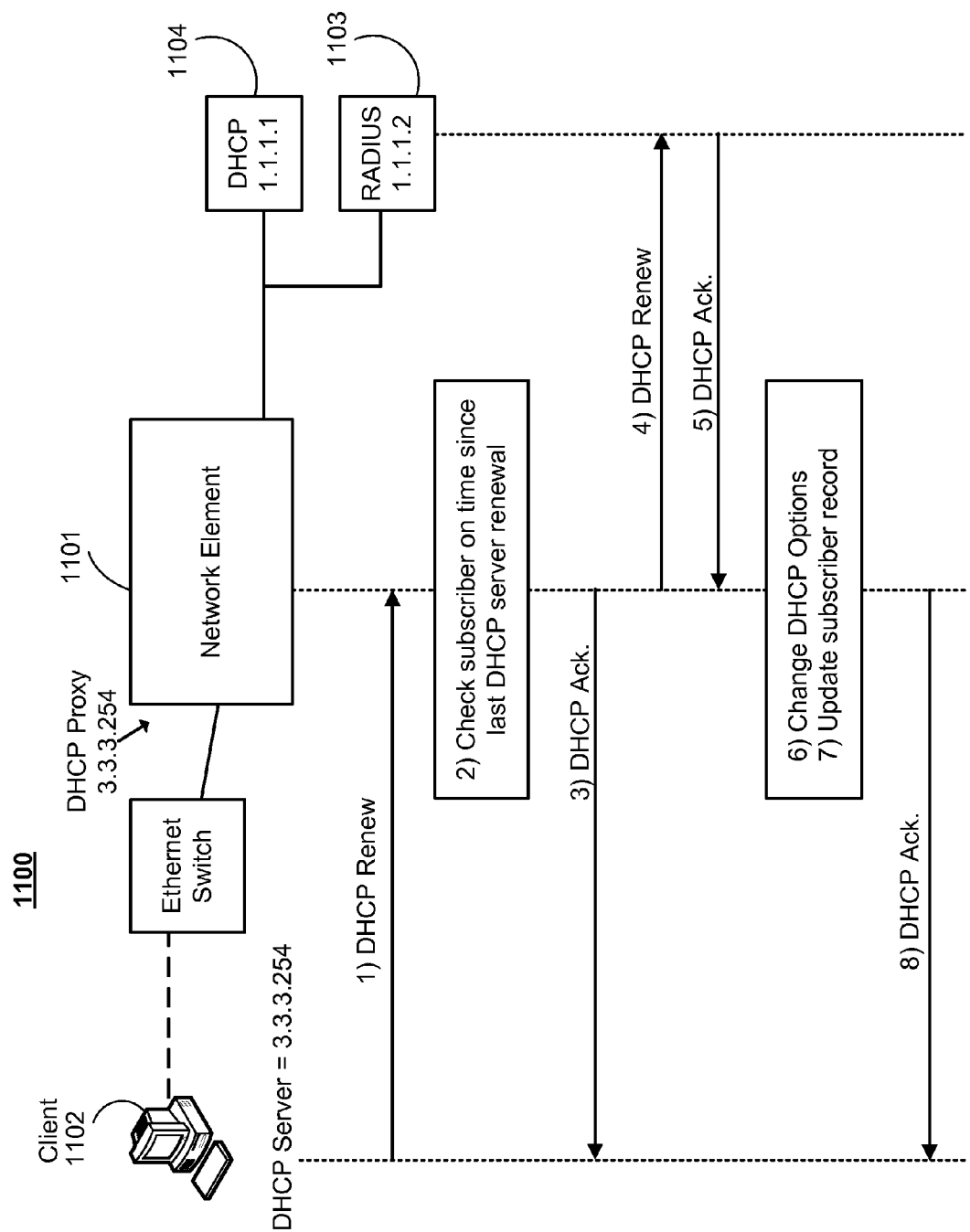
FIG. 11 is a flow diagram illustrating an exemplary process for DHCP renewal according to one embodiment of the invention.

FIG. 11 is a flow diagram illustrating an exemplary DHCP renewal process according to one embodiment of the invention. Referring to FIG. 11, according to one embodiment, when network element 1101 receives a DHCP lease renewal request from subscriber 1102, network element 1101 checks the subscriber session time since the last DHCP lease time value was received from the DHCP server. Network element 1101 may use the T1 timer from DHCP 1104 to determine how to react to the subscriber's renewal request.

In one embodiment, if the subscriber session time is less than DHCP T1 timer (e.g., there is more time left in the lease time allocated from DHCP 1104, where T1=x*duration of lease time), the network element may immediately send a DHCP reply packet to acknowledge the lease renewal for the subscriber without invoking DHCP 1104.

If the subscriber session time is greater or equal to the DHCP T1 timer (e.g., no enough lease time left in the lease time previously allocated from DHCP 1104), network element 1101 may forward the DHCP lease renewal packet to DHCP 1104 for more lease time. In response, network element 1101 receives a DHCP reply from DHCP 1104 including, but not limited to, DHCP options such as the lease time, which may include a longer lease time longer than the one requested by client 1102. When network element 1101 forwards the packet client 1102, the DHCP lease time is changed to reflect the subscriber specific configuration (e.g., the lowest value of the subscriber idle timer and the DHCP server applied lease time). Meanwhile, network element 1101 may also update the subscriber record regarding the lease time from DHCP 1104 for future use. Thereafter, network element 1101 forwards the DHCP acknowledge packet back to subscriber 1102. Other operations may be included.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method in a network element, wherein the network element is coupled with a client and a set of one or more Dynamic Host Configuration Protocol (DHCP) servers, the method comprising the steps:
   receiving, at the network element from the client, a DHCP discover packet;
   modifying the DHCP discover packet by replacing a source IP address of the DHCP discover packet with a first IP address of the network element;
   transmitting, to the set of one or more DHCP servers, the modified DHCP discover packet;
   receiving, at the network element, a DHCP offer packet from at least one of the set of DHCP servers;
   modifying the DHCP offer packet by replacing a source IP address of the DHCP offer packet with a second IP address of the network element;
   transmitting the modified DHCP offer packet to the client;
   receiving, at the network element from the client, a DHCP request packet;
   modifying the DHCP request packet by replacing a source IP address of the DHCP request packet with the first IP address of the network element;
   transmitting, to at least one of the set of DHCP servers, the modified DHCP request packet;
   receiving, at the network element, a DHCP acknowledgement packet from the one of the set of DHCP servers;
   modifying the DHCP acknowledgement packet by replacing a source IP address of the DHCP acknowledgement packet with the second IP address of the network element; and
   transmitting the modified DHCP acknowledgement packet to the client.

2. The method of claim 1, wherein the first IP address and the second IP address of the network element are different.

3. The method of claim 1, wherein the set of DHCP servers include an active DHCP server and a redundant DHCP server configured in a pair, and wherein the redundant DHCP server takes over the services of the active DHCP server when the active DHCP server is down.

4. The method of claim 3, wherein the active and redundant DHCP servers share the same IP address pool to provide IP addresses to clients.

5. The method of claim 1, further comprising:
   wherein the DHCP offer packet received from the at least one of the set of DHCP servers indicates a lease of an IP address for a first amount of lease time; and
   prior to transmitting the modified DHCP offer packet to the client, further modifying the DHCP offer packet by indicating a lease of an IP address for a second amount of lease time, wherein the second amount of lease time is smaller than the first amount of lease time.

6. The method of claim 5, further comprising:
   receiving, from the client, a DHCP renewal request;
   determining that the time remaining on the first amount of lease time is greater than or equal to an amount of time of a requested lease time renewal; and
   transmitting a reply to the client acknowledging the renewal without involving the set of DHCP servers.

7. The method of claim 1, further comprising installing a host route and an Address Resolution Protocol (ARP) entry for the client.

8. The method of claim 1, further comprising:
   receiving, from the client, a release request;
   modifying the release request by replacing a source IP address of the DHCP offer packet with the first IP address of the network element; and
   transmitting the modified release request to the one of the set of DHCP servers that assigned an IP address to the client.

9. A network element, comprising:
   a processor; and
   a memory coupled to the processor having instructions that, when executed by the processor, cause the processor to perform operations including,
   receive, at the network element from a client, a DHCP discover packet;
   modify the DHCP discover packet received from the client by replacing a source IP address of the DHCP discover packet with a first IP address of the network element;
   transmit, to a set of one or more DHCP servers, the modified DHCP discover packet;
   receive, at the network element, a DHCP offer packet from at least one of the set of DHCP servers;
   modify the DHCP offer packet by replacing a source IP address of the DHCP offer packet with a second IP address of the network element;
   transmit the modified DHCP offer packet to the client;
   receive, at the network element from the client, a DHCP request packet;
   modify the DHCP request packet by replacing a source IP address of the DHCP request packet with the first IP address of the network element
   transmit, to at least one of the set of DHCP servers, the modified DHCP request packet;
   receive, at the network element, a DHCP acknowledgement packet from the one of the set of DHCP servers;
   modify the DHCP acknowledgement packet by replacing a source IP address of the DHCP acknowledgement packet with the second IP address of the network element; and
   transmit the modified DHCP acknowledgement packet to the client.

10. The network element of claim 9, wherein the first IP address and the second IP address of the network element are different.

11. The network element of claim 9, wherein the set of DHCP servers include an active DHCP server and a redundant DHCP server configured in a pair, and wherein the redundant DHCP server is configured to take over the services of the active DHCP server when the active DHCP server is down.

12. The network element of claim 11 wherein the active and redundant DHCP servers share the same IP address pool to provide IP addresses to clients.

13. The network element of claim 9, wherein the memory further has instructions that, when executed by the processor, cause the processor to perform the following:
  wherein the DHCP offer packet received from the at least one of the set of DHCP servers indicates a lease of an IP address for a first amount of lease time; and
  prior to transmission of the modified DHCP offer packet to the client, further modify the DHCP offer packet by indicating a lease of an IP address for a second amount of lease time, wherein the second amount of lease time is smaller than the first amount of lease time.

14. The network element of claim 13, wherein the memory further has instructions that, when executed by the processor, cause the processor to perform the following:
  receive, from the client, a DHCP renewal request;
  determine that the time remaining on the first amount of lease time is greater than or equal to an amount of time of a requested lease time renewal; and
  transmit a reply to the client acknowledging the renewal without involving the set of DHCP servers.

15. The network element of claim 9, wherein the memory further has instructions that, when executed by the processor, cause the processor to install a host route and an Address Resolution Protocol (ARP) entry for the client.

16. The network element of claim 9, wherein the memory further has instructions that, when executed by the processor, cause the processor to perform the following:
  receive, from the client, a release request;
  modify the release request by replacing a source IP address of the DHCP offer packet with the first IP address of the network element; and
  transmit the modified release request to the one of the set of DHCP servers that assigned an IP address to the client.

* * * * *

UNITED STATES PATENT AND TRADEMARK OFFICE
CERTIFICATE OF CORRECTION

PATENT NO. : 9,143,479 B2  
APPLICATION NO. : 13/557128  
DATED : September 22, 2015  
INVENTOR(S) : Arberg et al.

Page 1 of 1

It is certified that error appears in the above-identified patent and that said Letters Patent is hereby corrected as shown below:

In the Specification

In Column 1, Line 8, delete "2004, which" and insert -- 2004, now Pat. No. 8,230,067, which --, therefor.

In Column 2, Line 20, delete "element 103" and insert -- element 101 --, therefor.

In Column 11, Line 60, delete "grater" and insert -- greater --, therefor.

In Column 12, Line 21, delete "subscriber 102" and insert -- subscriber 1002 --, therefor.

Signed and Sealed this  
Twenty-first Day of June, 2016

Michelle K. Lee  
*Director of the United States Patent and Trademark Office*